United States Patent [19]

Curtet

[11] Patent Number: 5,432,728
[45] Date of Patent: Jul. 11, 1995

[54] PROCESS FOR PERFORMING NUMERICAL COMPUTATIONS, AND ARITHMETIC UNIT FOR IMPLEMENTING THIS PROCESS

[75] Inventor: Joël, AndréQuai de Drac Curtet

[73] Assignee: SGS-Thomson Microelectronics S.A., Gentilly, France

[21] Appl. No.: 86,670

[22] Filed: Jul. 1, 1993

[30] Foreign Application Priority Data

Jul. 3, 1992 [FR] France ................ 92 08235

[51] Int. Cl.⁶ ................................................ G06F 7/50
[52] U.S. Cl. ...................................... 364/787; 364/786
[58] Field of Search ............... 364/768, 784, 786, 787, 364/788, 736

[56] References Cited

U.S. PATENT DOCUMENTS

| | | | |
|---|---|---|---|
| 4,764,886 | 8/1988 | Yano | 364/787 |
| 4,876,661 | 10/1989 | Koya | 364/787 |
| 4,914,617 | 4/1990 | Putrino et al. | 364/786 |
| 4,956,802 | 9/1990 | Priem | 364/787 |
| 5,043,934 | 8/1991 | Lamp | 364/787 |
| 5,047,974 | 9/1991 | Young | 364/784 |
| 5,047,975 | 9/1991 | Patti | 364/786 |
| 5,189,636 | 2/1993 | Patti et al. | 364/786 |
| 5,278,783 | 1/1994 | Edmondson | 364/787 |

OTHER PUBLICATIONS

IEEE Transactions on Computers, vol. c-31, No. 3, Mar. 1982, New York, US, pp. 260-264, Brent et al., "A Regular Layout for Parallel Adders".
19th Asilomar Conference on Circuits, Systems & Computers, Nov. 6, 1985, IEEE, NY, US, pp. 186-191, WEI et al., "Time-Optimal Design of a CMOS Adder".
Proc. of the IEER Custom IC Conference, May 1988, IEEE NY, US, pp. 1751-1756, XP000011200, Hwang et al., "A High Speed Dynamically Reconfigurable 32-bit CMOS Adder".
R. P. Brent et al., A Regular Layout for Parallel Adders, 1982, pp. 260-264, IEEE Transactions On Computers, NYC, US.
D. E. Kirk (Ed.), Time-Optimal Design Of A CMOS Adder, 1986, pp. 186-191, U. of CA/Berkeley, 19th Asilomar Conference . . . , US.
I. S Hwang et al, A High–Speed Dynamically Reconfigurable 32-Bit CMOS Adder, 1988, pp. 1751-1756, Proc. Of The IEEE 1988 Custom Integrated Circuits Conference, Rochester, NY, US.

*Primary Examiner*—Roy N. Envall, Jr.
*Assistant Examiner*—Chuong D. Ngo
*Attorney, Agent, or Firm*—Wolf, Greenfield & Sacks

[57] ABSTRACT

An arithmetic unit includes a 33-bit operator. The bit of rank 16 serves to select either a first working mode in which the operator performs a computation on the 32 bits, or a second working mode in which the operator performs two parallel computations on 16 bits. Computational resources of the operator may best be used in an optimal manner.

21 Claims, 2 Drawing Sheets

PROCESS FOR PERFORMING NUMERICAL COMPUTATIONS, AND ARITHMETIC UNIT FOR IMPLEMENTING THIS PROCESS

BACKGROUND OF THE INVENTION

FIELD OF THE INVENTION

The present invention relates to a process for performing numerical computations in an electronic circuit. The invention relates likewise to an arithmetic unit for implementing this process.

A main aim of the progress in technology used in integrated circuits is to increase processing speeds. A sector for which this progress is of particular relevance is numerical data processing, especially by microcontrollers or microprocessors and signal processors (DSP, for "Digital Signal Processor"). These types of circuit always include an Arithmetic and Logic Unit (ALU), which often constitutes the critical route for the data determining the maximum frequency at which the circuit can work.

Many current circuits include an ALU which performs the logic or arithmetic computations between two 32-bit operands, and generates a result on 32 bits. However, some computations can be performed on 16-bit operands (not needing maximum accuracy, management of logic operands on 16 bits, etc). The ALU then no longer works on 16 bits, and half of it therefore remains inactive; only half the computational power of the ALU is then used.

One of the most constraining jobs in terms of computation time is arithmetic addition/subtraction, and more particularly the carry propagation in such an operation.

The most conventional way of effecting a binary addition on n bits between two operands A (An-1 An-2 ... A1 A0) and B (Bn-1 Bn-2 ... B1 B0) consists in propagating the carry linearly, from one bit to the next bit, using elementary adders. The elementary adders perform, for each bit, the following two operations:

$$Si = Ai \char`\^ Bi \char`\^ Ci-1$$

$$Ci = (Ai.Bi) + ((Ai \char`\^ Bi).Ci-1)$$

with:

- Ai, Bi: i-th bit of operand A and B;
- Si: i-th bit of the result of the addition (S=A+B);
- Ci: carry generated by the elementary addition in position i;
- "^": logical exclusive OR
- ".": logical AND; and
- "+": logical OR.

By this method, it is possible to estimate the time required to effect one binary addition on N bits by: $T(N) = N \times T1$, where T1 represents the time required by each elementary adder to compute the carry Ci as a function of Ci−1, Ai, Bi. It is seen that this time is determined entirely by the serial mode of propagation of the carry.

However, the "carry propagation" function can be effected more quickly if: serial propagation is replaced with parallel propagation. There are however various ways of effecting this parallelization: nowadays, the main methods used in circuits made by CMOS technology are:

carry selection, discreetization of the propagation by use of concatenation operators.

The method by carry selection (Carry Select) consists in subdividing the operation over N bits by using, for example three adder sub-blocks each working on N/2 bits (here N is assumed to be even). The first adder sub-block performs the addition in linear carry propagation mode over the N/2 least significant bits of the operands while the other two adder sub-blocks perform, in parallel, addition over the N/2 most significant bits of the operands, the second sub-block assuming that the outgoing carry from the first sub-block equals 0 while the third sub-block assumes that this carry equals 1. Then, the carry actually leaving the first adder sub-block controls a multiplexer which selects that one of the two results arising from the second and third adder sub-blocks which corresponds to the carry result. If certain of the computations are effected in parallel, the computation time for an N-bit addition by the method of carry selection can be estimated by:

$$T'(N) = N/2 * T1 + T0$$

where T'1 is equal to the T1 of the elementary adder with linear propagation and T'0 is the time required for the selection between the two possible results for the intermediate carry. If T'0 is neglected, T' (N) (Carry Select) is of the order of half of T(N) (linear propagation). Note that the "Carry Select" principle can be generalized in order to optimize propagation time: it is possible to split an addition over N bits into several additions over numbers of distinct bits. For example, an addition over 32 bits can be effected with five sub-blocks of ascending size: 3, 5, 6, 8, 10.

Typically, with such a "Carry Select" adder, an addition over 32 bits is performed in 1.4 times less time than with the equivalent with linear propagation.

An even more powerful method of effecting an addition over N bits consists in using the basic principles described by BRENT and KUNG ("A Regular Layout for Parallel Adders" IEEE Transactions on Computers, Vol. C-31, No. 3, March 1982): binary addition over N bits can be transformed into a parallel computation using the concatenation operator "o" defined by:

$$(gl, pl) \; o \; (gr, pr) = (gl + pl.gr, \; pl.pr).$$

Consider, for each bit in position i, the terms:
"generate": $gi = Ai.Bi$; and
"propagate": $pi = Ai \char`\^ Bi$
The outgoing carry for each bit is then:

$$Ci = Gi \text{ for } i = 0, \ldots, N\text{-}1$$

with $$(Gi, Pi) = (gi, pi) \qquad \text{for } i = 0; \text{ and}$$
$$(Gi, Pi) = (gi, pi) \; o \; (Gi-1, Pi-1) \quad \text{for } 0 < i < N$$

The incoming carry Cin being determined, each sum bit is obtained:

$$S0 = p0 \char`\^ Cin; \text{ and}$$

$$Si = pi \char`\^ Ci-1 \text{ for } 0 < i < N$$

The operator "o" being associative (but not commutative), it is possible to write:

$(Gi, Pi) = (gi,pi) \, o \, (gi - 1, pi - 1) \, o \ldots o \, (g0,p0)$
$= (gi,pi) \, o \ldots o \, (gm,pm) \, o \, (gm - 1,pm - 1) \, o \ldots o \, (g0,p0)$
$= (Gi,m; Pi,m) \, o \, (GM - 1,0; Pm - 1,0)$ with:

$(Gi,m; Pi,m) = (gm,pm)$      if $i = m$; and
$(Gi,m; Pi,m) = (gi,pi) \, o \, (Gi - 1,m; Pi - 1,m)$      if $i > m$.

The computation of (Gi,Pi) is therefore performed on the basis of two terms (Gi,m; Pi,m) and (Gm−1,0: Pm−1, 0) which are functionally of the same type: they are a function of i−m+1 (respectively m) consecutive input bits and require i−m (respectively m+1) applications of the operator "o". Accordingly, they can be computed by the same type of circuit.

, It is therefore possible to improve the conventional BRENT and KUNG decomposition in which each carry generation block is divided recursively into two sub-blocks of equal dimension m=N/2. The improvement is via a recursive division into sub-blocks of unequal dimension and via the use of amplifying circuits: this minimizes the carry propagation interval. The basis of this optimization principle was published in 1986 by B. W. Y. WEI, C. THOMPSON, Y- F. CHEN in the article "Time-Optimal Design of a CMOS Adder" (IEEE publication of 1986 No. CH23317/86/0000/0186$01.00 following the conference ACSC-85: Asilomar Circuit System and Computer, page 186). The implementation of this algorithm leads to addition times which do not depend linearly on the number of bits (for example, an addition over 32 bits is only 1.15 times slower than an addition over 16 bits).

Typically, with such an adder, an addition over 32 bits is performed in 2.3 times less time than with the equivalent with linear carry propagation.

When desiring the same linear carry propagation operator of an arithmetic and logic unit to afford selectively either an operation over 32 bits or two parallel operations over 16 bits, it can be made in the form of a 32-bit operator by mounting a selection multiplexer between the elementary adders of respective ranks 15 and 16.

Control of the selection multiplexer then makes it possible to select whether the incoming carry in the half-operator corresponding to the 16 most significant bits is the outgoing carry from the half-operator corresponding to the 16 least significant bits (the incoming carry being supplied to an input of the selection multiplexer) thereby performing a "normal" addition over 32 bits; or whether this incoming carry is an external carry bit supplied to another input of the selection multiplexer, thereby performing two independent parallel additions of 16 bits.

This simple solution can also be applied to a carry selection adder, with the following restriction: in order to easily insert a mode selection multiplexer (32 bits or 2×16 bits) the bit of rank 15 must be situated at the output of one of the sub-blocks of this type of operator. It will then be possible easily to adapt the control of this multiplexer so that the incoming carry of the half-operator corresponding to the 16 most significant bits is:
- either the outgoing carry from the other half-operator: and addition over 32 bits is then effected;
- or an external carry bit: two independent parallel additions over 16 bits are then effected.

This solution however imposes a constraint in regard to the optimal choice of the size of the sub-blocks.

However, in an optimized BRENT and KUNG type ALU, such a way of selecting the working modes of the operator cannot be applied without losing the benefit of implementing this algorithm: this would amount to making two BRENT and KUNG type adders mounted in series which, when working in 32-bit mode would have a carry propagation time markedly greater than that of a single 32-bit BRENT and KUNG type adder (typically 1.5 times greater).

There is therefore a need for a process making it possible, by applying an optimal carry propagation algorithm, in particular the optimized BRENT and KUNG algorithm, to effect with the same operator either an operation over n+m bits or two parallel operations over n bits and over m bits respectively, with n=m=16 in a typical example.

The purpose of the present invention is to meet this need.

SUMMARY OF THE INVENTION

The invention thus proposes a process for performing numerical computations by means of an operator adapted to receive two N-bit operands and produce an N-bit result. The operator includes a preconditioning circuit, a carry generator and a summing circuit which are mounted in cascade. The preconditioning circuit comprises N cells which are mounted in parallel, each of these N cells receiving two bits of like rank of the two N-bit operands and producing first and second logic combinations of these two bits of like rank. The carry generator receives the logic combinations from the preconditioning circuit and an incoming carry bit and computes N carry bits. The summing circuit comprises N elementary adders mounted in parallel. Each of these N elementary adders receives one of the first logic combinations from a corresponding cell of the preconditioning circuit and one of the carry bits from the carry generator and produces one of the bits of the N-bit result by performing an exclusive OR logic operation between this first logic combination and this carry bit. Furthermore one of the N cells of the preconditioning circuit is used as a selection cell in order to selectively control two working modes of the operator, namely a first working mode in which the number with N−1 bits (consisting of the bits of the N-bit result) but not the bit whose rank corresponds to that of the selection cell is the result of an operation performed on the two numbers with N−1 bits, each consisting of the bits of one of the N-bit operands, but not the bit whose rank corresponds to that of the selection cell, and a second working mode in which the two numbers consisting of the bits of the N-bit result whose rank is less than that of the selection cell and of the bits of the N-bit result whose rank is greater than that of the selection cell are the results of two operations performed in parallel on the two numbers respectively, each consisting of the bits of one of the N-bit operands whose rank is less than that of the selection cell and on the two numbers each consisting of the bits of one of the N-bit operands whose rank is greater than that of the selection cell.

Thus, the computational resources of the operator are used optimally. In the typical case where N=33 and where the selection cell is the 17-th cell (or cell of rank 16) of the preconditioning circuit, the process makes it possible to reduce substantially by 50% the time required for execution of a program handling 16-bit operands and for which two operations on 16 bits can be performed simultaneously.

The invention thus makes it possible to produce a 33-bit optimized operator, in particular an adder of the BRENT and KUNG type, which, through appropriate control of the selection cell and without modifying the working of the carry generator, makes it possible either to regard the selection cell as transparent and thus to effect operations on 32 bits, or to regard a selection cell as a delimiter which separates the adder into two independent sub-adders which effect additions over 16 bits, which sets the incoming carry in the sub-adder over the 16 most significant bits, and which outputs the outgoing carry from the sub-adder over the 16 least significant bits.

This solution includes the following advantages:

the regularity is preserved of the layout of the cells which constitute the carry generator in the optimized Brent [sic] and Kung implementation (no appending of multiplexing cells, for example, which would break this regularity);

the increase in surface area remains minimal (1/32 or 3.12%);

the same optimization algorithm is used to split the 33-bit carry generator into blocks of unequal dimensions;

the loss in propagation time for a computation over 33 bits (leading to a result over 32 bits) is negligible: of the order of 1.9% (it would be 1/32, namely 3.12%, when going from a 32-bit to 33-bit linear carry propagation adder, without counting the time for crossing the additional multiplexer).

According to the second aspect of the invention, an arithmetic unit comprises an N-bit operator of the type mentioned above is such that, n and m designating integer numbers such that $n+1+m=N$, the first n bits of the two N-bit operands are supplied to the corresponding cells of the preconditioning circuit via two n-bit input registers, the last m bits of the two N-bit operands are supplied to the corresponding cells of the preconditioning circuit via two m-bit input registers, the first n bits of the N-bit result are addressed to an n-bit output register by the corresponding elementary adders of the summing circuit, and the last m bits of the N-bit result are addressed to an m-bit output register by the corresponding elementary adders of the summing circuit. The $(n+1)$-th cell of the preconditioning circuit is a selection cell capable of controlling selectively two working modes of the operator, namely a first working mode in which the number with $n+m=N-1$ bits consisting of the union of the bits of the two output registers is the result of an operation performed on the two numbers with $n+m=N-1$ bits each consisting of the union of the bits of an n-bit input register and of the bits of an m-bit input register, and a second working mode in which the two numbers consisting respectively of the bits of the n-bit output register and of the bits of the m-bit output register are the results of two operations performed in parallel on the two numbers respectively each consisting of the bits of the two n-bit input registers and on the two numbers each consisting of the bits of the two m-bit input registers.

This arithmetic unit is designed to implement the above process.

Other features and advantages of the invention will emerge in the following description of a preferred, non-limiting embodiment, read conjointly with the attached drawings.

DETAILED DESCRIPTION

Figure 1:
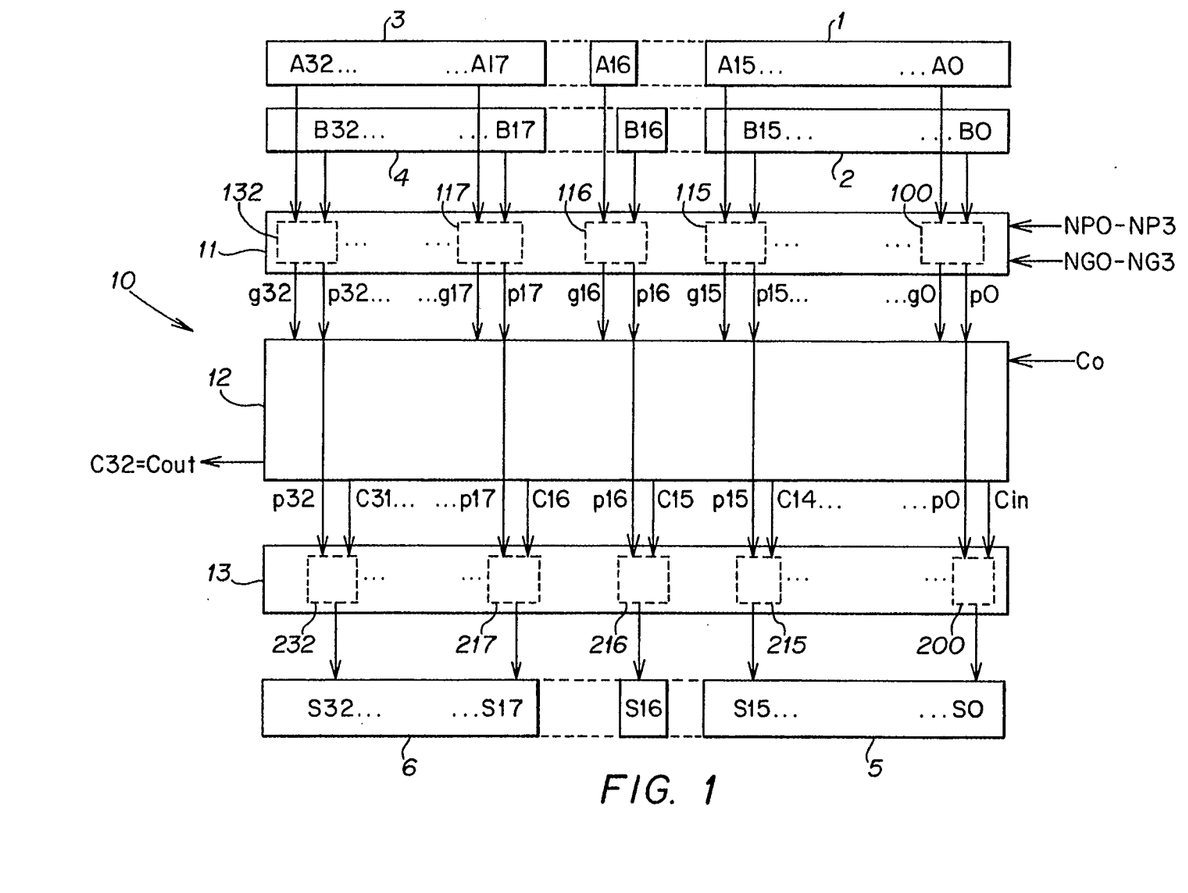
FIG. 1 is a schematic diagram of an arithmetic unit according to the invention.

With reference to FIG. 1, an arithmetic unit according to the invention comprises an operator 10 adapted to receive two N-bit operands A32 A31 . . . A0, B32 B31 . . . B0 and produce an N-bit result S32 S31 . . . S0. In the example represented, $N=33$.

The operator 10 includes a preconditioning circuit 11, a carry generator 12 and a summing circuit 13 which are mounted in cascade.

The preconditioning circuit 11 comprises N identical cells 100 to 132 mounted in parallel. Each of these N cells 100 to 132 receives two bits of like rank A0,B0 to A32,B32 of the two N-bit operands and produces two logic combinations p0,g0 to p32,g32 of these two bits of like rank, which combinations are determined by eight binary control signals NP0 to NP3, NG0 to NG3.

Figure 2:
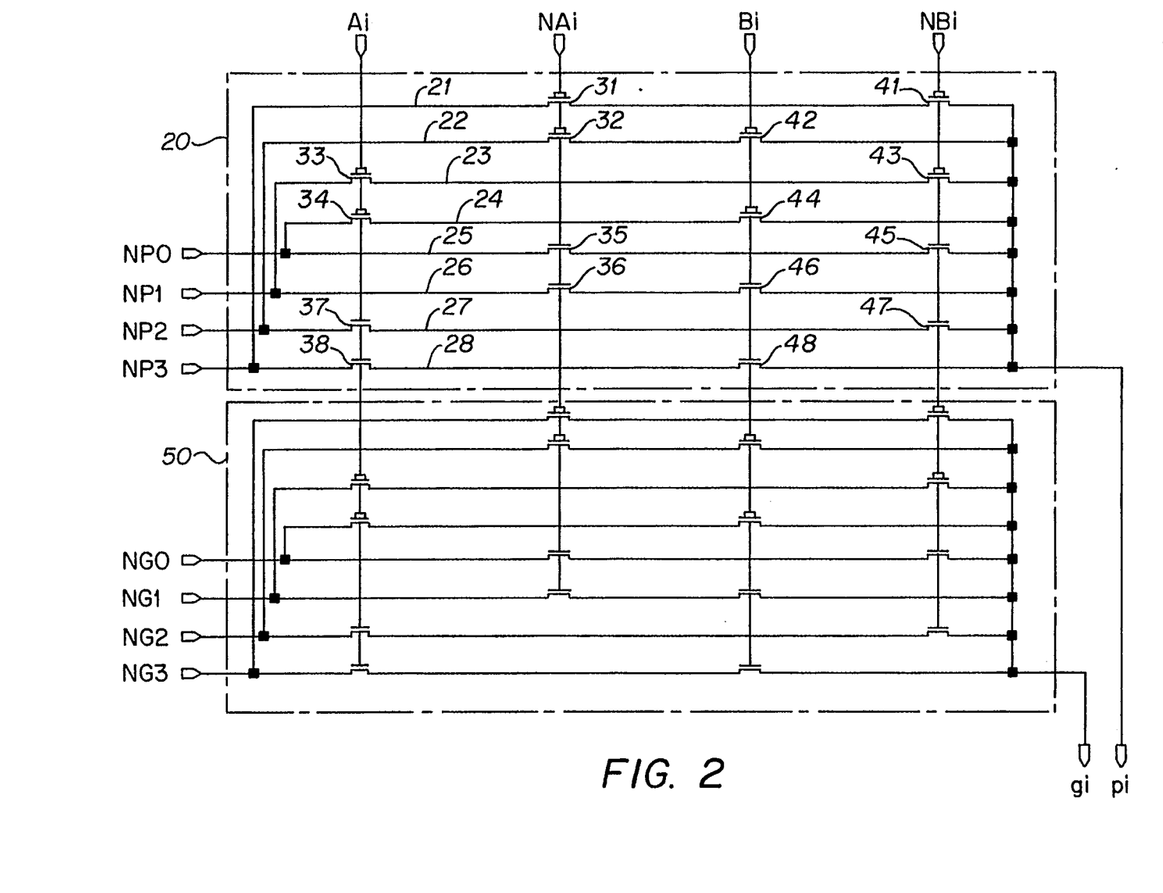
FIG. 2 is an electrical diagram of a cell of a preconditioning circuit contained in the arithmetic unit of FIG. 1.

FIG. 2 represents an illustrative cell usable in the preconditioning circuit 11. This cell comprises a module 20 controlled by the signals NP0 to NP3 in order to produce the first logic combination pi and an identical module 50 controlled by the signals NG0 to NG3 in order to produce the second logic combination gi. The module 20 comprises eight MOS transistor lines 21 to 28 connected to the output of the cell delivering the first logic combination pi. With Ai and Bi designating the two bits of corresponding rank of the two N-bit operands, the logic inverses of the bits Ai and Bi obtained through a straightforward inverting gate, not shown, are designated NAi and NBi. Line 21 receives the binary control signal NP3 and includes the source-drain paths of two p-channel MOS transistors 31, 41 whose gates receive the bits NAi and NBi respectively. Line 22 receives the binary control signal NP2 and includes the source-drain paths of two p-channel MOS transistors 32, 42 whose gates receive the bits NAi and Bi respectively. Line 23 receives the binary control signal NP1 and includes the source-drain paths of two p-channel MOS transistors 33, 43 whose gates receive the bits Ai and NBi respectively. Line 24 receives the binary control signal NP0 and includes the source-drain paths of two p-channel MOS transistors 34, 44 whose gates receive the bits Ai and Bi respectively. Line 25 receives the binary control signal NP0 and includes the source-drain paths of two n-channel MOS transistors 35, 45 whose gates receive the bits NAi and NBi respectively. Line 26 receives the binary control signal NP1 and includes the source-drain paths of two n-channel MOS transistors 36, 46 whose gates receive the bits NAi and Bi respectively. Line 27 receives the binary control signal NP2 and includes the source-drain paths of two n-channel MOS transistors 37, 47 whose gates receive the bits Ai and NBi respectively. Line 28 receives the binary control signal NP3 and includes the source-drain paths of two n-channel MOS transistors 38, 48 whose gates receive the bits Ai and Bi respectively. Thus, the output pi from the module 20 is the following logic combination:

$$pi = NP0 \cdot NAi \cdot NBi + \qquad (1)$$
$$NP1 \cdot NAi \cdot Bi +$$
$$NP2 \cdot Ai \cdot NBi +$$
$$NP3 \cdot Ai \cdot Bi$$

where "+" designates the OR logic operation and "." the AND logic operation.

Similarly, module 50 delivers a logic combination gi equal to $$gi = NG0 \cdot NAi \cdot NBi + \qquad (2)$$
$$NG1 \cdot NAi \cdot Bi +$$
$$NG2 \cdot Ai \cdot NBi +$$
$$NG3 \cdot Ai \cdot Bi$$

The logic combinations pi, gi produced by the cells 100 to 132 can therefore be selected by fixing the values of the control signals NP0 to NP3, NG0 to NG3.

The carry generator 12 receives the logic combinations arising from the preconditioning circuit 11 and an incoming carry bit Cin and computes N carry bits C0 to C32. The carry generator 12 is produced in the way described in the article "Time-Optimal Design of a CMOS Adder" mentioned earlier so as to implement the optimized BRENT and KUNG algorithm on N=33 bits. The last carry bit C32 computed by the carry generator 12 is equal to the outgoing carry bit Cout of the operator 10.

The summing circuit 13 comprises N elementary adders 200 to 232 mounted in parallel. Each of these N elementary adders 200 to 232 consists of an exclusive OR gate receiving one of the first logic combinations p0 to p32 arising from a corresponding cell of the preconditioning circuit 11 and one of the carry bits Cin, C0 to C31 arising from the carry generator 12 and producing one of the bits S0 to S32 of the N-bit result. The bit of rank 0 of the N-bit result is equal to p0^Cin, where "^" designates the exclusive OR logic operation, while the bit of rank i>0 of an N-bit result is equal to pi^Ci−1.

The arithmetic unit represented in FIG. 1 furthermore comprises two n-bit input registers 1,2, two m-bit input registers 3,4, an n-bit output register 5 and an m-bit output register 6 (n and m are integers and n+1+m=N). In the example represented, N being odd (N=33), n=m=(N−1)/2=16. The first n bits, A0 to A15, B0 to B15 (least significant bits), of the two N-bit operands are supplied to the corresponding cells 100 to 115 of the preconditioning circuit 11 via two n-bit input registers 1, 2. The last m bits A17 to A32, B17 to B32 (most significant bits) of the two N-bit operands are supplied to the corresponding cells 117 to 132 of the preconditioning circuit 11 via two m-bit input registers 3, 4. The first n bits S0 to S15 of the N-bit result are addressed to the n-bit output register 5 by the corresponding elementary adders 200 to 215 of the summing circuit 13. The last m bits S17 to S32 of the N-bit result are addressed to the m-bit output register 6 by the corresponding elementary adders 217 to 232 of the summing circuit 13.

The (n+1)-th cell, or cell of rank n, of the preconditioning circuit 11 is used as selection cell 116 in order to control selectively two working modes of the operator 10, which are detailed below.

In the first working mode, N−1 bits S32, S31 . . . S17, S15, S14 . . . S0, consisting of the union of the bits of two output registers 5, are the result of an operation performed on bits A32, A31 . . . A17, A15, A14 . . . A0 consisting of the union of n-bit input register 1 and of m-bit input register 3, and on N−1 bits B32, B31 . . . B17, B15, B14 . . . B0 consisting of the union of the m-bit input register 2 and of m-bit input register 4. The N−1 bit number S31 . . . S17, S15 S14 . . . S0 consisting of the N-bit result except for bit S16 whose rank corresponds to that of the selection cell 116 is then the result of an operation performed on the two numbers with N−1 bits A32, A31 . . . A17, A15, A14 . . . A0, and B32, B31 . . . B17, B15, B14 . . . B0 each consisting of the bits of one of the N-bit operands except for the bit A16, B16 whose rank corresponds to that of the selection cell 116.

In the second working mode with n and m bits, the two numbers S15, S14 . . . S0 and S32, S31 . . . S17, consisting respectively of the bits of the n-bit output register 5 and of the bits of the m-bit output register 6, are the results of two operations performed in parallel on the two numbers A15, A14 . . . A0 and B15, B14 . . . B0 respectively, each consisting of the bits of one of the two n-bit input registers 1, 2 and on the two numbers A32 A31 . . . A17 and B32, B31 . . . B17 each consisting of the bits of one of the two m-bit input registers 3,4. The two numbers S15, S14 . . . S0 and S32, S31 . . . S17, consisting respectively of the bits of the N-bit result whose rank is less than that of the selection cell 116 and of the bits of the N-bit result whose rank is greater than that of the selection cell 116, are then the results of two operations performed in parallel on the two n-bit numbers A15 A14 . . . A0, B15, B14 . . . B0 respectively, each consisting of the bits of one of the N-bit operands whose rank is less than that of the selection cell 116 and on the two m-bit numbers A32, A31 . . . A17, B32 B31 . . . B17 each consisting of the bits of one of the N-bit operands whose rank is greater than that of the selection cell 116.

For the operator 10 to perform additions, each of the cells 100 to 115 and 117 to 132 of the preconditioning circuit 11 other than the selection cell 116 is controlled in such a way that its logic combinations pi, gi are such that pi=Ai^Bi and gi=Ai.Bi. This is obtained by enforcing NP0=NP3=NG0=NG1=NG2=0 and NP1=NP2=NG3=1 (formulae 1 and 2) for each of these cells 100 to 115 and 117 to 132. Under these conditions, the first working mode of the operator 10 is selected by controlling the selection cell 116 in such a way that its first logic combination p16 is equal to 1 and that its second logic combination g16 is equal to 0, and the second working mode of the operator 10 is selected by controlling the selection cell 116 in such a way that its logic combinations p16, g16 are equal to 0.

Selection between the two working modes can then be performed, for example, by enforcing either NP0=NP1=NP2=NP3=1 and NG0=NG1=NG2=NG3=0 for the selection cell 116 in the first mode, or NP0=NP1=NP2=NP3=0 and NG0=NG1=NG2=NG3=0 for the selection cell 116 in the second mode.

However when the operator 10 performs additions, it is preferable furthermore to control the selection cell 116 in such a way that p16=A16^B16 (NP0=NP3=0, NP1=NP2=1) and that g16=A16.B16 (NG0=NG1=NG2=0, NG3=1). The first working mode of the operator 10 is selected by assigning mutually inverse values to the two bits A16, B16 of the N-bit operands, and the second working mode of the operator 10 is selected by assigning zero values to the two bits A16, B16 of the N-bit operands. This makes it possible to address the same binary control signals NP0 to NP3, NG0 to NG3 to the N cells of the preconditioning circuit 11. In the second working mode, the value of the bit S16 of the N-bit result is then interpreted as being the outgoing carry from the addition performed on the two n-bit numbers A15, A14 ... A0 and B15, B14 ... B0, and the value of the outgoing carry bit C32=Cout is interpreted as being the outgoing carry from the addition performed on the two m-bit numbers A32, A31 ... A17 and B32 B31 ... B17. The incoming carry bit Cin addressed to the carry generator 12 represents the carry which has just been appended, either to the result on N−1 bits S32, S31 ... S17, S15, S14 ... S0 in the first working mode, or to the result on n bits S15, S14 ... S0 supplied to the output register 5 in the second working mode. For the operator 10 to perform additions in its second working mode by moreover appending a second incoming carry bit C2 to the addition performed on the two numbers A32, A31 ... A17, B32, B31 ... B17 present in the m-bit input registers 3, 4, values equal to that of this second incoming carry bit C2 are assigned to the two bits A16 and B16.

For the operator 10 to perform subtractions (of the type A-B), each of the cells 100 to 115; 117 to 132 of the preconditioning circuit 11 other than the selection cell 116 is controlled in such a way that its logic combinations pi,gi are such that $pi=Ai \char`\^ NBi$ and $gi=Ai.NBi$. This is obtained by enforcing $NP1=NP2=NG0=NG1=NG3=0$ and $NP0=NP3=NG2=1$ (formulae 1 and 2) for each of its cells 100 to and 117 to 132. Under these conditions, the first working mode of the operator 10 is selected by controlling the selection cell 116 in such a way that its first logic combination p16 is equal to 1 and that its second logic combination g16 is equal to 0 and by setting the incoming carry bit Cin to 1, and the second working mode of the operator 10 is selected by controlling the selection cell 116 in such a way that its first logic combination p16 is equal to 0 and that its second logic combination g16 is equal to 1, Cin remaining set to 1.

Selection between the two working modes can then be performed, for example, by enforcing either $NP0=NP1=NP2=NP3=1$ and $NG0=NG1=NG2=NG3=0$ for the selection cell 116 in the first mode, or $NP0=NP1=NP2=NP3=0$ and $NG0=NG1=NG2=NG3=1$ for the selection cell 116 in the second mode.

However, as in the case of addition, it is generally preferred that, when the operator 10 performs subtractions, the selection cell 116 receives binary control signals NP0 to NP3, NG0 to NG3 identical to those addressed to the other cells 100 to and 117 to 132 of the preconditioning circuit 11. The first working mode of the operator 10 is then selected by assigning identical values to the two bits A16 and B16 of the N-bit operands, and the second working mode of the operator 10 is selected by assigning values 1 and 0 respectively to the two bits A16 and B16 of the N-bit operands. In the second working mode, the value of the bit S16 of the N-bit result is then interpreted as being the outgoing carry from the subtraction performed between the two n-bit numbers A15, A14 ... A0 and B15, B14 ... B0, and the value of the outgoing carry bit C32=Cout is interpreted as being the outgoing carry from the subtraction performed between the two m-bit numbers A32, A31 ... A17 and B32, B31 ... B17.

In its second working mode, the operator 10 can furthermore be controlled so that it performs different operations on the n-bit numbers present in the input registers 1, 2 and on the m-bit numbers present in the m-bit input registers 3, 4. Thus, the operator 10 can be controlled in order to perform, in its second working mode, an addition between the two numbers A15, A14 ... A0, B15, B14 ... B0 present in the n-bit input registers 1, 2 and a subtraction between the two numbers A32, A31 ... A17, B32, B31 ... B17 present in the m-bit input registers 3, 4. The cells 100 to 115 of the preconditioning circuit 11 are then controlled in such a way that their logic combinations pi, gi are such that $pi=Ai \char`\^ Bi$ and $gi=Ai.Bi$ ($NP0=NP3=NG0=NG1=NG2=0$, $NP1=NP2=NG3=1$), the cells 117 to 132 of the preconditioning circuit 11 are controlled in such a way that their logic combinations pi, gi are such that $pi=Ai \char`\^ NBi$ and $gi=Ai.NBi$ ($NP0=NP3=NG2=1$, $NP1=NP2=NG0=NG1=NG3=0$) and the selection cell 116 is controlled in such a way that its first logic combination p16 is equal to zero (for example $NG0=NG1=NG2=NG3=0$) and that its second logic combination g16 is equal to 1 (for example $NG0=NG1=NG2=NG3=0$).

Similarly, the operator 10 can be controlled in order to perform, in its second working mode, a subtraction between the two numbers A15, A14 ... A0, B15, B14 ... B0 present in the n-bit input registers 1, 2 and an addition between the two numbers A32, A31 ... A17, B32, B31 ... B17 present in the m-bit input registers 3, 4. The cells 100 to 115 of the preconditioning circuit 11 are then controlled in such a way that their logic combinations pi, gi are such that $pi=Ai \char`\^ NBi$ and $gi=Ai.NBi$ ($NP0=NP3=NG2=1$, $NP1=NP2=NG0=NG1=NG3=0$) and by setting the incoming carry bit Cin to 1. The cells 117 to 132 of the preconditioning circuit 11 are controlled in such a way that their logic combinations p17 to p32 are such that $pi=Ai \char`\^ Bi$ and $gi=Ai.Bi$ ($NP0=NP3=NG0=NG1=NG2=0$, $NP1=NP2=NG3=1$), and the selection cell 116 is controlled in such a way that its logic combinations p16, g16 are equal to 0 (for example $NP0=NP1=NP2=NP3=NG0=NG1=NG2=NG3=0$).

The operator 10 can likewise be controlled to perform logic operations between individual bits of the first N-bit operand A32, A31 ... A0 and corresponding individual bits of the second N-bit operand B32, B31 ... B0. The arithmetic unit then constitutes an arithmetic and logic unit (ALU). To do this, the N cells 100 to 132 of the preconditioning circuit 11 are controlled in such a way that their second logic combinations g0 to g32 are all equal to a predetermined value, which is also assigned Cin.

For example the operator 10 can perform the following logic operations between corresponding bits of the N-bit operands:

AND ($Si=Ai.Bi$ for i different from 16) with $gi=g16=Cin=0$ ($NG0=NG1=NG2=NG3=0$), $pi=Ai.Bi$ ($NP0=NP1=NP2=0$, $NP3=1$) and p16 immaterial;

OR ($Si=Ai+Bi$ for i different from 16) with $gi=g16=Cin=1$ ($NG0=NG1=NG2=NG3=1$), $pi=NAi.NBi$ ($NP0=1$, $NP1=NP2=NP3=0$) and p16 immaterial; and exclusive OR ($Si=Ai \char`\^ Bi$ for i different from 16) with $gi=g16=Cin=0$ ($NG0=NG1=NG2=NG3=0$), pi=Ai~Bi (NP0=NP3=0, NP1=NP2=1) and p16 immaterial.

Although the invention has been described with reference to a preferred illustrative embodiment, it will be understood that this example is not limiting and that diverse variants may be afforded thereto without departing from the scope of the invention.

Thus, the invention has been described in the preferred case of an ALU with N=33 bits capable of performing either an operation on 32 bits, or two parallel operations on n=m=16 bits, but the invention can also be applied with arbitrary odd N and n=m=(N−1)/2, or even with N, n and m all arbitrary, provided that N=n+1+m.

What is claimed is:

1. An arithmetic unit, comprising:
   an operator adapted to receive first and second N-bit operands and produce an N-bit result, the operator including:
   a preconditioning circuit,
   a carry generator, and
   a summing circuit, mounted in cascade,
   wherein the preconditioning circuit comprises N+1 cells mounted in parallel, the N+1 cells including a selection cell and N preconditioning cells, each of the N preconditioning cells receiving two bits of like rank of the first and second N-bit operands and having means for producing a first and a second logic combination of the two received bits,
   wherein the carry generator receives the first and second logic combinations from the preconditioning circuit and also receives an incoming carry bit, said carry generator having means for computing N carry bits from the first and second logic combinations and the incoming carry bit,
   wherein the summing circuit comprises N elementary adders mounted in parallel, each of the N elementary adders receiving the first logic combination from a corresponding preconditioning cell and receiving a corresponding carry bit from the carry generator and wherein each elementary adder produces one bit of the N-bit result by performing an exclusive OR logic operation between the first logic combination and the corresponding carry bit,
   wherein n and m designate integer numbers such that n+m=N and the first n bits of the first and second N-bit operands are supplied to corresponding preconditioning cells via a first and second n-bit input register, and the last m bits of the first and second N-bit operands are supplied to corresponding preconditioning cells via a first and second m-bit input register, the first n bits of the N-bit result are addressed to an n-bit output register by the corresponding elementary adders of the summing circuit, and the last m bits of the N-bit result are addressed to an m-bit output register by the corresponding elementary adders of the summing circuit, and
   wherein the (n+1)th cell of the preconditioning circuit is the selection cell for selectively controlling the operator according to a first and a second working mode, in which
   in the first working mode the bits of the n-bit and m-bit output registers are the result of an operation performed on a first set of two numbers of N bits,
   a first number of the first set consisting of a union of bits of the first n-bit input register and the first m-bit input register, and
   a second number of the first set consisting of a union of bits of the second n-bit input register and the second m-bit input register, and
   in the second working mode a second set of two numbers, consisting respectively of the bits of the n-bit output register and of the bits of the m-bit output register, is the result of two operations performed in parallel on a third set of two numbers and on a fourth set of two numbers,
   a first number of the third set consisting of the bits of the first n-bit input register, and a second number of the third set consisting of the bits of the second n-bit input register, and
   a first number of the fourth set consisting of the bits of the first m-bit input register, and a second number of the fourth set consisting of the bits of the second m-bit input register.

2. The arithmetic unit as claimed in claim 1, wherein N+1 is odd and n=m=N/2.

3. The arithmetic unit as claimed in claim 2, in which N+1=33.

4. An arithmetic unit as set forth in claim 1 further including means for controlling the preconditioning circuit to perform addition by controlling each of the N preconditioning cells to produce an exclusive OR logic operation as its first logic combination and produce an AND logic operation as its second logic combination, the first working mode being selected by controlling the selection cell such that its first logic combination is equal to 1 and that its second logic combination is equal to 0, and the second working mode of the operator being selected by controlling the selection cell such that the first and second logic combinations are equal to 0.

5. An arithmetic unit as set forth in claim 4, wherein the means for controlling the preconditioning circuit to perform addition controls the selection cell such that its first logic combination is an exclusive OR logic operation and that its second logic combination is an AND logic operation, the first working mode being selected by supplying mutually inverse values to the bits of the first and second N-bit operands having the same rank as the selections cell, and the second working mode being selected by supplying zero values to the bits of the first and second N-bit operands having the same rank as the selection cell.

6. An arithmetic unit as claimed in claim 5 wherein the means for controlling the preconditioning circuit to perform addition appends a second incoming carry bit to the addition performed on the fourth set of two numbers by supplying the bits of the first and second N-bit operands having the same rank as the selection cell with values equal to that of the second incoming carry bit.

7. An arithmetic unit as claimed in claim 1 further including a means for controlling the preconditioning circuit to perform subtraction by controlling each of the cells of the preconditioning circuit other than the selection cell to produce as its first logic combination an exclusive OR logic operation using the inverse of the bit of corresponding rank of the second N-bit operand and to produce as its second logic combination an AND logic operation using the inverse of the bit of corresponding rank of the second N-bit operand, the first working mode being selected by controlling the selection cell such that its first logic combination is equal to one and that its second logic combination is equal to zero and by setting the incoming carry bit to 1, and the second working mode being selected by controlling the selection cell such that its first logic combination is equal to zero and that its second logic combination is equal to one, the incoming carry bit being set to one.

8. An arithmetic unit as set forth in claim 7 wherein the means for controlling the preconditioning circuit to perform subtractions controls the selection cell such that its first logic combination is an exclusive OR logic operation using the inverse of the bit corresponding rank of the second N-bit operand and that its second logic operation is an AND logic operation using the inverse of the bit of corresponding rank of the second N-bit operand, the first working mode being selected by providing the bits of the first and second N-bit operands having the same rank as selection cell with identical values, and the second working mode being selected by providing the bits of the first and second N-bit operand with the values 1 and 0 respectively.

9. An arithmetic unit as set forth in claim 1 further including means for controlling the preconditioning circuit to perform an addition between the third set of two numbers and a subtraction between the fourth set of two numbers, wherein each of the cells of the preconditioning circuit whose rank is less than that of selection circuit is controlled in such a way that its first logic combination is an exclusive OR logic operation and that its second logic combination is an AND logic operation, and wherein each of the cells of the preconditioning circuit whose rank is greater than that of the selection circuit is controlled in such a way that its first logic combination is an exclusive OR logic operation using the inverse of the bit of corresponding rank of the second N-bit operand and that its second logic combination is an AND logic operation using the inverse of the bit of the corresponding rank of the second N-bit operand, and the selection cell is controlled in such a way that its first logic combination is equal to 0 and that its second logic combination is equal to 1.

10. An arithmetic unit as set forth in claim 1 further including means for controlling the preconditioning circuit to perform a subtraction between the third set of two numbers and to perform an addition between the fourth set of two numbers, wherein each of the cells of the preconditioning circuit whose rank is less than that of the selection circuit is controlled in such a way that its first logic combination is an exclusive OR logic operation using the inverse of the bit of corresponding rank of the second N-bit operand and that its second logic combination is an AND logic operation using the inverse of the bit corresponding rank of the second N-bit operand, each of the cells of the preconditioning circuit whose rank is greater than that of the selection cell being controlled in such a way that its first logic combination is an exclusive OR logic operation and its second logic combination is an AND logic operation, and the selection cell is controlled in such a way that its logic combinations are equal to 0.

11. A method for controlling a N-bit arithmetic unit that includes a N-bit preconditioning circuit, a N-bit carry generator, and a N-bit summing circuit connected in cascade in respective order, the method comprising the steps of:
supplying a first and second N-bit operand to the N-bit preconditioning circuit that then produces a first and second logic combination for each bit;
supplying the N-bit carry generator with the N first and the N second logic combinations produced by the N-bit preconditioning circuit and with an incoming carry bit, the carry generator then computing N carry bits;
supplying the N carry bits and the N first logic combinations to the summing circuit, which comprises N elementary adders mounted in parallel, wherein each adder produces a result bit by performing an exclusive OR logic operation between a corresponding first logic combination and corresponding carry bit, and
controlling one of the N bits of the N-bit preconditioning circuit to act as a selection cell that selectively controls the arithmetic unit to operate according to either a first or a second working mode, in which
the first working mode produces a N−1 bit result from two N−1 bit operands, the two N−1 bit operands comprising the N-bit operands except for the operand bit whose rank corresponds to that of the selection cell, and the N−1 bit result comprising the N result bits except for the result bit whose rank corresponds to that of the selection cell; and in which
the second working mode produces an m-bit result and a n-bit result in parallel, wherein the m-bit result corresponds to the m result bits for each N-bit operand whose rank is higher than that of the selection cell, and wherein the n-bit result corresponds to the n bits for each N-bit operand whose rank is less than that of the selection cell.

12. A method for controlling a N-bit arithmetic unit as set forth in claim 11 in which in order to perform addition operations the preconditioning circuit performs an exclusive OR logic operation as its first logic combination and performs an AND logic operation as its second logic combination, and wherein the step of controlling one of the N cells of the preconditioning circuit to act as a selection cell includes controlling the selection cell such that its first logic combination results in a value equal to one and that its second logic combination results in a value equal to zero in order to select the first working mode, and controlling the selection cell such that its first and second logic combination results in values equal to zero in order to select the second working mode.

13. The method as set forth in claim 12 wherein the step of controlling one of the N cells of the preconditioning circuit to act as a selection cell includes controlling the selection cell such that its first logic combination is produced by performing an exclusive OR logic operation and that its second logic combination is produced by performing an AND logic operation, and in which mutually inverse values are assigned to the bits of the N-bit operands whose rank corresponds to that of the selection cell, in order to select the first working mode, and by assigning zero values to the bits of the N-bit operands whose rank corresponds to that of the selection cell, in order to select the second working load.

14. The method as set forth in claim 13 comprising a further step in order to include a second incoming carry bit to the m-bit operation of the second working mode, in which the value of the second incoming carry bit is supplied to the bit of the N-bit operands whose rank corresponds to that of the selection cell.

15. The method of claim 11 wherein N is odd and m and n equal (N−1)/2.

16. The method of claim 15 wherein N equals 33.

17. The method for controlling a N-bit arithmetic unit of claim 11 in which in order to perform subtraction operations the preconditioning circuit forms an exclusive OR logic operation on the first N-bit operand and the logical inverse of the second N-bit operand as its first logic combination and performs an AND logic operation between the first N-bit operand and the and the logical inverse of the second N-bit operand as its second logic combination, and wherein the step of controlling one of the N cells of the preconditioning circuit to act as a selection cell includes controlling the selection cell such that its first logic combination results in a value equal to one and that its second logic combination results in a value equal to zero, the incoming carry bit being set to a value equal to one, in order to select the first working load, and controlling the selection cell such that its first logic combination results in a value equal to zero and that its second logic combination results in a value equal to one, the incoming carry bit being set to one, in order to select the second working mode.

18. The method of claim 17 wherein the step of controlling one of the N cells of the preconditioning circuit to act as a selection cell includes controlling the selection cell such that its first logic combination is produced by performing an exclusive OR logic operation on the first N-bit operand and the logical inverse of the second N-bit operand and that its second logic combination is produced by performing an AND logic operation on the first N-bit operand and the logical inverse of the second N-bit operand, and in which identical values are assigned to the bits of the N-bit operands whose rank corresponds to that of the selection cell, in order to select the first working mode, and by assigning a value of one to the bit of the first N-bit operand whose rank corresponds to that of the selection cell and by assigning a value of zero to the bit of the second N-bit operand whose rank corresponds to that of the selection cell, in order to select the second working mode.

19. The method of claim 11 in which in order to perform an addition operation between the n-bits of the first and second operand and a subtraction operation between the m-bits of the first and second operand, the n-bits of the preconditioning circuit performs an exclusive OR logic operation as its first logic combination and performs an AND logic operation as its second logic combination, and wherein the m-bits of the preconditioning circuit performs an exclusive OR logic operation of the first m-bit operand and the logical inverse of the second m-bit operand as its first logic combination, and performs an AND logic operation of the first m-bit operand and the logical inverse of the second m-bit operand as its second logic operation, and wherein the step of controlling one of the N cells of the preconditioning circuit to act as a selection cell includes controlling the selection cell such that its first and second logic combinations are equal to zero.

20. The method of claim 11 in which in order to perform a subtraction operation between the n-bits of the first and second operand and an addition operation between the m-bits of the first and second operand, the n-bits of the preconditioning circuit performs an exclusive OR logic operation on the first n-bit operand and the logical inverse of the second n-bit operand as its first logic combination and performs an AND logic operation on the first n-bit operand and the logical inverse of the second n-bit operand as its second logic combination, and wherein the m-bits of the preconditioning circuit performs an exclusive OR logic operation of the first m-bit operand and the logical inverse of the second m-bit operand as its first logic combination, and performs an AND logic operation of the first m-bit operand and the logical inverse of the second m-bit operand as its second logic operation, and wherein the step of controlling one of the N cells of the preconditioning circuit to act as a selection cell includes controlling the selection cell such that its first and second logic combinations are equal to zero.

21. The method of claim 11 in which in order to perform logic operations between the first n-bit operand and the second n-bit operand, the preconditioning circuit is controlled such that the second logic combinations results in a predetermined value which is also assigned to the incoming carry bit, so as to cause the N carry bits to have the predetermined value.

* * * * *